(12) United States Patent
You et al.

(10) Patent No.: US 10,140,556 B2
(45) Date of Patent: Nov. 27, 2018

(54) ARABIC OPTICAL CHARACTER RECOGNITION METHOD USING HIDDEN MARKOV MODELS AND DECISION TREES

(71) Applicant: HUAZHONG UNIVERSITY OF SCIENCE AND TECHNOLOGY, Wuhan, Hubei (CN)

(72) Inventors: Xinge You, Hubei (CN); Mohammed Lutf, Hubei (CN)

(73) Assignee: HUAZHONG UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 0 days.

(21) Appl. No.: 14/844,713

(22) Filed: Sep. 3, 2015

(65) Prior Publication Data
US 2017/0017854 A1    Jan. 19, 2017

(30) Foreign Application Priority Data

Jul. 17, 2015 (CN) .......................... 2015 1 0420294

(51) Int. Cl.
*G06K 9/00* (2006.01)
*G06K 9/46* (2006.01)
*G06K 9/62* (2006.01)

(52) U.S. Cl.
CPC ....... *G06K 9/6282* (2013.01); *G06K 9/00463* (2013.01); *G06K 9/00879* (2013.01); *G06K 9/4642* (2013.01); *G06K 9/6297* (2013.01); *G06K 2209/013* (2013.01)

(58) Field of Classification Search
CPC ...... G06K 9/18; G06K 9/4604; G06K 9/6282; G06K 9/6297; G06T 7/0079
See application file for complete search history.

(56) References Cited

PUBLICATIONS

Benouareth, Abdallah, Abdellatif Ennaji, and Mokhtar Sellami. "Arabic handwritten word recognition using HMMs with explicit state duration." Eurasip journal on advances in signal processing 2008.1 (2007): 1-13.*

(Continued)

*Primary Examiner* — Menatoallah Youssef
(74) *Attorney, Agent, or Firm* — Hamre, Schumann, Mueller & Larson, P.C.

(57) ABSTRACT

Disclosed is an Arabic optical character recognition method using Hidden Markov Models and decision trees, comprising: receiving an input image containing Arabic text, removing all diacritics from the input image by detecting a bounding box of each diacritic and comparing coordinates thereof to those of a bounding box of a text body, segmenting the input image into four layers, and conducting feature extraction on the segmented four layers, inputting results of feature extraction into a Hidden Markov Model thereby generating HMM models for representing each Arabic character, conducting iterative training of the HMM models until an overall likelihood criterion is satisfied, and inputting results of iterative training into a decision tree thereby predicting locations and the classes of the diacritics and producing final recognition results. The invention is capable of facilitating simple recognition of Arabic by utilizing writing feature thereof, and meanwhile featuring comparatively high recognition precision.

3 Claims, 3 Drawing Sheets

(56) References Cited

PUBLICATIONS

Daifallah, Khaled, Nizar Zarka, and Hassan Jamous. "Recognition-based segmentation algorithm for on-line Arabic handwriting." 2009 10th International Conference on Document Analysis and Recognition. IEEE, 2009.*

Touj, Sameh Masmoudi, Najoua Essoukri Ben Amara, and Hamid Amiri. "Arabic handwritten words recognition based on a planar hidden Markov model." Int. Arab J. Inf. Technol. 2.4 (2005): 318-325.*

El-Hajj, Ramy, Laurence Likforman-Sulem, and Chafic Mokbel. "Arabic handwriting recognition using baseline dependent features and hidden markov modeling." Document Analysis and Recognition, 2005. Proceedings. Eighth International Conference on. IEEE, 2005.*

Benouareth, Abdallah, Abdellatif Ennaji, and Mokhtar Sellami. "Arabic handwritten word recognition using HMMs with explicit state duration." Eurasip journal on advances in signal processing 2008.1 (2007): 1-13. (Year: 2007).*

Daifallah, Khaled, Nizar Zarka, and Hassan Jamous. "Recognition-based segmentation algorithm for on-line Arabic handwriting." 2009 10th International Conference on Document Analysis and Recognition. IEEE, 2009. (Year: 2009).*

\* cited by examiner

ARABIC OPTICAL CHARACTER RECOGNITION METHOD USING HIDDEN MARKOV MODELS AND DECISION TREES

CROSS-REFERENCE TO RELATED APPLICATIONS

The present application is a U.S. non-provisional application which claims priority to Chinese Application No. 201510420294.8, filed on Jul. 17, 2015, which is herein incorporated by reference in its entirety.

FIELD OF THE INVENTION

The invention relates to the optical character recognition (OCR) field, and more particularly to an Arabic optical character recognition method using Hidden Markov Models and decision trees.

BACKGROUND OF THE INVENTION

Optical Character Recognition (OCR) is one of the oldest problems in computer pattern recognition, and has been listed as the oldest data entry after keypunching. OCR can be defined as mechanical or electronic conversion of scanned or photoed images of typewritten or printed text into machine-encoded/computer-readable text. While OCR is a well-established technique for many languages, especially Latin and Chinese, for Arabic it is still in an early stage.

Due to characteristics of the Arabic writing system, optical character recognition thereof is far more complex than other languages. Such characteristics are: the text direction is from right to left, the cursive writing is in both handwritten and machine printed text, each character has different shapes for different positions in a word, dots and diacritical signs above and below the characters, a variable length of an elongation of connecting lines between characters, vertical or horizontal ligatures, as well as different sizes (height and width) for each character. All of these characteristics influence processing and recognition of Arabic characters in different ways, and make it impossible to use conventional character-based processing like the Latin language.

A main issue with existing Arabic OCR methods is that none of them has considered the above-mentioned characteristics of Arabic text as advantages in a recognition process. Instead, they describe these characteristics only as source of complexity.

SUMMARY OF THE INVENTION

In view of the above-mentioned problems, it is an objective of the invention to provide an Arabic optical character recognition method using Hidden Markov Models and decision trees capable of making a recognition process simple and featuring high recognition precision by making full use of characteristics of the Arabic text.

To achieve the above objective, according to one embodiment of the present invention, there is provided an Arabic optical character recognition method using Hidden Markov Models and decision trees, comprising steps of: receiving an input image containing an Arabic text, removing all diacritics from the input image by detecting a bounding box of each diacritic and comparing coordinates thereof with those of a bounding box of a text body, segmenting the input image into four layers, and conducting feature extraction on the segmented four layers, inputting results of feature extraction into a Hidden Markov Model thereby generating HMM models for representing each Arabic character, conducting iterative training of the HMM models until an overall likelihood criterion is satisfied, and inputting results of iterative training into a decision tree thereby predicting locations and the classes of the diacritics and producing final recognition results.

In a class of this embodiment, removing of the diacritics comprises determining a bounding box of a region surrounding the text body, and labeling the region as a diacritic if the bounding box of the region surrounding the text body is positioned within a bounding box of the text body.

In a class of this embodiment, removing of the diacritics further comprises labeling the region as a diacritic if an X coordinate of a region surrounding the text body intersects with that of the text body.

In a class of this embodiment, the method further comprises vertically scanning the input image from a top one column at a time, and mapping each segment of connected black pixels contained in the column to remaining layers after segmenting the input image into four layers.

In a class of this embodiment, the method further comprises mapping the segment of connected black pixels contained in the column to the fourth layer if a column contains only one segment of connected black pixels.

In a class of this embodiment, the step of conducting feature extraction on the segmented four layers comprises: simultaneously sliding a window with a three-pixel width on the four layers, and moving the window by one pixel at a time from index zero.

In a class of this embodiment, the step of conducting feature extraction on the segmented four layers further comprises: extracting the number of layers containing black pixels as a first feature, extracting a mean of a sum of the first layer and the fourth layer as a second feature, extracting a mean of a sum of the second layer and the third layer as a third feature, extracting a sum of vertical projection of all four layers as a fourth feature, a fifth feature, and a sixth feature, and extracting vertical projection of the third layer as a seventh feature, an eighth feature, and a ninth feature.

In a class of this embodiment, a separate HMM model is used for each Arabic character shape.

In a class of this embodiment, a HMM model is used for modeling an elongation between Arabic characters.

According to another embodiment of the present invention, there is provided a method for establishing a HMM-based encoding network using connectivity rules of Arabic optical characters in a recognition process, the method comprising: providing three non-emitting states in the HMM-based encoding network; a beginning non-emitting state disposed at the beginning of the network, an end non-emitting state disposed at the end of the network, and a middle non-emitting state disposed at the middle of the network, connecting the beginning non-emitting state to an isolated position character model, and the isolated position character model to the end non-emitting state, connecting the beginning non-emitting state to a beginning position character model, and the beginning position character model to the middle non-emitting state, connecting the middle non-emitting state to an end position character model, and the end position character model to the end non-emitting state, connecting in parallel the middle non-emitting state to a middle position character model, and connecting the middle position character model back to the middle non-emitting state thereby forming a loop between the middle non-emitting state and the middle position character model, connecting in parallel the middle non-emitting state to an elongation model, and connecting the elongation model back to the middle non-emitting state thereby forming a loop between the middle non-emitting state and the elongation model, and connecting the end non-emitting state to the beginning non-emitting state.

In a class of this embodiment, the method further comprises using the HMM-based encoding network to output the most optimal character sequence.

In a class of this embodiment, the method further comprises combining an output of a HMM with a diacritics feature using a decision tree, thereby output a final recognition result.

To summarize, compared with conventional Arabic OCR methods, the Arabic optical character recognition method of the invention is capable of significantly increasing recognition precision by separating diacritics from character shapes and conditioning the diacritic and/or the character shape one on the other.

BRIEF DESCRIPTION OF ACCOMPANYING DRAWINGS

DETAILED DESCRIPTION OF SPECIFIC EMBODIMENTS

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Arabic is an alphabetic language with 28 characters, and each character has 2 or 4 different shapes depending on a position thereof in a word: beginning, middle or end, and whether or not it is isolated, equating to 100 character shapes. In addition to this, and depending on a font type, ligature and diacritics introduce new shapes, which, in some fonts, may produce 120 different shapes. In fact, this huge number of character shapes and diacritics has many similarities among them. For example, four characters may be found to have the same four shapes differing only in the diacritics associated with them. Similarly, the same diacritic could be attached to many different character shapes, meaning that there is much information which could be shared among different characters and diacritics. Furthermore, there is a strong relationship between a diacritic class and a character shape where knowledge of the diacritic class may increase or decrease a probability that a given character shape exists in a word, and vice versa. So, by separating the diacritics from the character shapes and conditioning the diacritic and/or the character shape one on the other, recognition precision of Arabic optical characters can be highly and confidently increased, which is also a main goal for most OCR systems.

Figure 1:
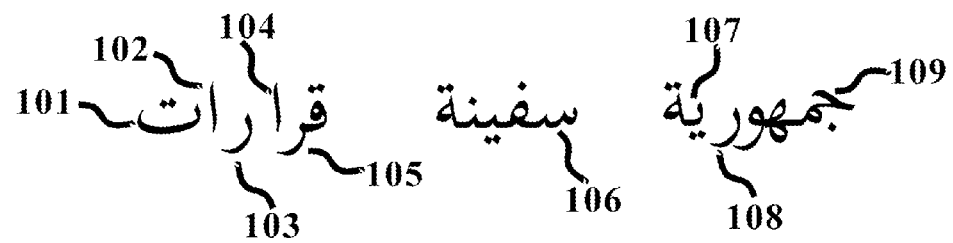
FIG. 1 is an example of three Arabic words with different number of pieces of Arabic words.

In Arabic, each word consists of one or more connected characters, but, not all characters have a middle shape, and this is a key point since it causes words to be broken into many sub-words or what many publications call a Piece of Arabic Word (PAW) as shown in FIG. 1. Accordingly, each PAW could be a PAW with only one character in an isolated shape 101, 102, 103, 104, or 108, or a PAW with only two characters, one in its beginning shape, and the other in its end shape 105 or 107, or a PAW with three or more characters, one in its beginning shape, one in its end shape and one or more in its middle shape 106 or 109, and this exhibits a very important characteristic of the Arabic writing system, which states that: the middle shape of the characters is the most frequently occurring shape in the Arabic writing system. This means that, for any Arabic OCR system, the middle shape of the characters needs to be paid more attention than the other shapes.

Therefore, during a recognition stage, a position property of the character and its relation to the character shape can be used to validate whether or not a recognition result obeys the PAW rules described above since each letter shape always has a dedicated position label. For example, if a PAW contains 5 characters, a recognition result is to contain five character shapes, where the first character is a shape in the beginning form, the last character is a shape in the end form, and the other three are character shapes in the middle form, and any result other than this can be rejected.

Figure 2:
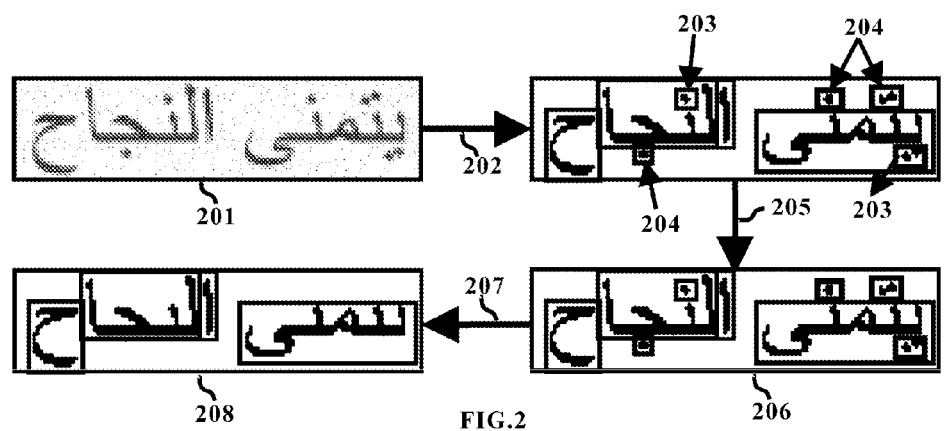
FIG. 2 illustrates a preprocessing process of an Arabic optical character recognition method using Hidden Markov Models and decision trees of the invention.

An Arabic optical character recognition method using Hidden Markov Models and decision trees of the invention comprises steps of:

(1) receiving an input image containing Arabic text;

(2) removing all diacritics from the input image by detecting a bounding box of each diacritic and comparing coordinates thereof with those of a bounding box of a text body;

The main idea of removing the diacritics is based on a font design principle of Arabic. As known to all, in designing an Arabic font, a center of the diacritic is always vertically aligned with that of the character shape, and a size thereof is smaller than that of the character shape. Therefore, a bounding box of a diacritic connected component (or referred to as 'region') is to be within a bounding box of a text body connected component 203, or at least an X coordinate of a diacritic image is to intersect with that of a text body image 204, as shown in FIG. 2. This procedure is repeated for all objects surrounding a PAW text body, including the diacritics and any noise objects.

Figure 3:
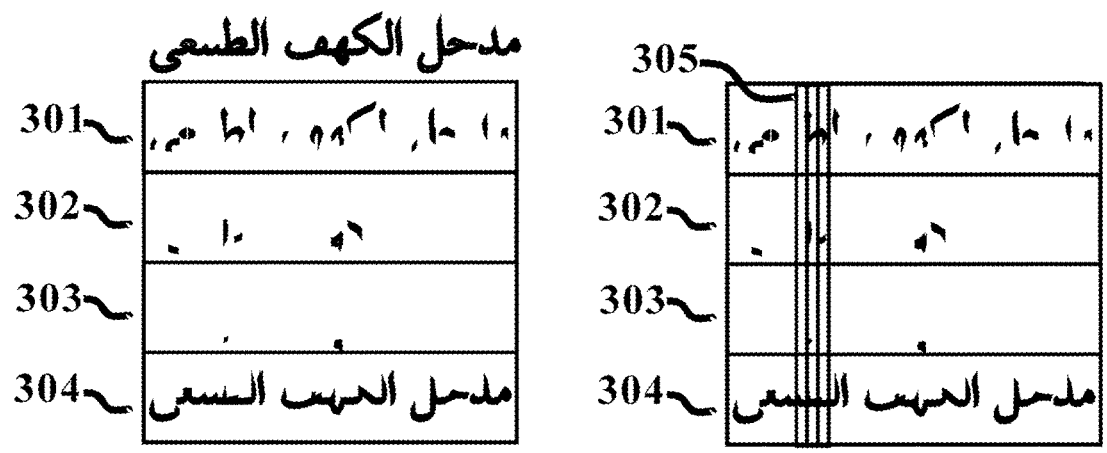
FIG. 3 illustrates a features extraction process of the Arabic optical character recognition method using Hidden Markov Models and decision trees of the invention.

(3) segmenting the input image into four layers, and conducting feature extraction on the segmented four layers;

For each PAW, the ascenders and descenders are main parts of any character shape. In fact, distinction and separation between connected characters are mainly based on the ascenders and the descenders. Hence, the ability to capture information related to the ascenders and the descenders of each character is to highly enhance discrimination between characters. In the present invention, the features are extracted from a PAW by using a multi-layer separation technique. A PAW image is scanned from the top one column at a time and map each segment of connected pixels to a separate layer as shown in FIG. 3. If a column contains only one segment, then it is mapped to the last layer. Four layers are sufficient for the majority of Arabic fonts. The first 301 and the fourth layers 304 contain more PAW text body than the second 302 and the third layers 303. After mapping the PAW to the layers, a sliding window 305 with a 3-pixel width simultaneously moves one pixel at a time along the four layers for features extraction. Nine different features are extracted from each window mainly based on distribution of pixels in each layer as follows:

Let $L_i$ represents the $i^{th}$ layer, where $1 \le i \le 4$, then:
$F_1$=the number of layers containing black pixels.
$F_2$=mean $(L_1+L_4)$
$F_3$=mean $(L_2+L_3)$
$F_4 \sim F_6 = \Sigma_{i=1}^{4}$ Vertical Projection $(L_i)$
$F_7 \sim F_9$=Vertical Projection $(L_3)$ After the features are extracted, each character shape is modeled as an HMM.

(4) inputting results of feature extraction into a Hidden Markov Model thereby generating HMM models for representing each Arabic character;

(5) conducting iterative training of the HMM models until an overall likelihood criterion is satisfied; and (6) inputting results of iterative training into a decision tree thereby predicting locations and the classes of the diacritics and producing final recognition results.

Each character shape is modeled by a single left-right HMM with 8 states, and each state has a transition to its two following states in addition to itself. The Hidden Markov Models toolkit (HTK) available from the University of Cambridge is used for implementation of a system. HTK supports multiple steps in the recognition process: data preparation, training, recognition and post-processing. HTK models a feature vector with a mixture of Gaussian distributions (9 Gaussians in the system), as well as the Viterbi decoder algorithm in the recognition phase searching for the most likely sequence of characters under a given input feature vector.

In order for HTK to successfully decode a given input, a dictionary and a encoding network are used along with the Viterbi decoder. The dictionary is just a simple text file which contains a mapping table between the HMMs and the final output. In the present invention, a final output is a character shape name, and this is because a Viterbi recognizer works on a character level without diacritics. The encoding network describes a sequence of HMMs constituting each PAW. This particular point is the soul of the present invention, in which what has always been seen as a difficulty in the Arabic writing system: connectivity of the characters is used and turned into an advantage.

Figure 4:
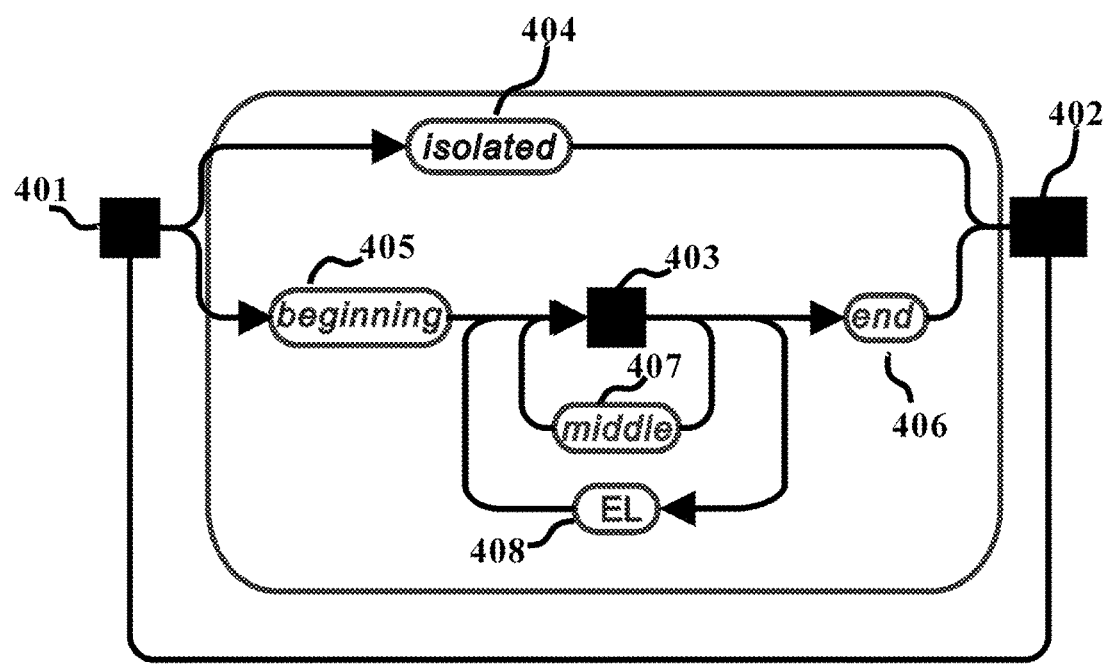
FIG. 4 illustrates a HMM-based encoding network.

Following the PAW rules, the encoding network is built by encoding all PAWs based on the character position property as shown in FIG. 4. The character position property defines a sequence of characters in a PAW, the number of character shapes allowed in a given position, and connection allowed between two given character positions with its preceding and/or former character position. Three non-emitting states are defined in the network; two are a beginning 401 and an end 402 of the network allowing PAW models to be concatenated for continuously recognizing the input PAW, and a third non-emitting state 403 (also referred to as middle non-emitting state) positioned between a beginning position 405 and an end position 406, and allowing escaping the middle position 407 in the case of a PAW with only two characters. The middle state 403 allows integrating PAWs of two characters with PAWs of three or more characters all in the same network. Connection between the middle state 403 and the middle position 407 is in parallel and also forms a loop, and this is the most important part of the network, because it makes it possible to encode any number of middle shapes in a PAW. For example, if there is a PAW with five characters, the first character is to be assigned to the beginning position, then a loop is repeated three times for the middle position, and ultimately the final character is assigned to the end position. However, if the PAW contains only two characters, the network will move directly from the beginning position 405 to the end position 406. In the case of a PAW with only one character, the network will go directly through the isolated position 404.

An elongation in Arabic text is a horizontal line used to connect characters. The elongation can be placed after the beginning and middle form of characters shapes, and is mostly used for text justification. However, while a PAW is modeled as a temporal process using HMM, the elongation is to occupy specific time duration and cause the Viterbi decoder to output invalid labels for places where the elongation exist especially when there is a long elongation. In the present invention, this problem is solved by introducing an elongation model 408 having 3 fully-connected states, and it is connected to the middle state 403 in parallel, because it may occur optionally and repeatedly any number of times Based on the syntax of the Arabic writing system, there is a very useful relationship between the letter shape and the diacritic class. For the majority of Arabic characters, each diacritic-free character shape has its equivalent character shape with diacritics. During the preprocessing step, all diacritics are removed from the input PAW image; then, based on the output result of the HMMs, it is predicted whether or not the diacritics exist. As required, the diacritic class is recognized. The idea of diacritic recognition is mainly based on the Arabic font design principle. However, diacritics seem to be separated from the character shape, but in fact, they are a fixed part of the letter shape and entered with the letter shape using only one key on the keyboard. So, in resizing a character or changing its font type, the diacritic is to change too, but its position related to the character position is to remain the same.

Therefore, except for the character shape class, the HMM also outputs approximate boundaries of the character shape. This boundary information can be used to limit a search area and label all objects around the character shape to ascertain if one of them is a diacritic. Four main features are extracted from the character shape: the font size (which may not be the true font size, but the diacritic will have the same size), the diacritic center, the width ratio between the diacritic and character shape, and the diacritic location (above or under the character shape). These features are used to classify the objects around the character shape and to detect which one of them is a diacritic.

Characters shapes related to the diacritics can be classified into 5 different groups:

1. Character shapes having no diacritics at all: in this case, an output of the HMM will be the final recognition result 2. Character shapes having diacritics in a specific location (always above the character shape): in this case, existence or absence of the diacritic above the character shape is enough to tell the final recognition result.

3. Character shapes with only one diacritic class, but this diacritic could be above or under the character shape: in this case, the location of the diacritic is enough to tell the final recognition result.

4. Character shapes having multi-diacritic classes in a specific location (always above the character shape): in this case, the diacritic class is enough to tell the final recognition result.

5. Character shapes having multi-diacritic classes above or under the character shape: in this case, the diacritic class and its location are needed to tell the final recognition result.

What should be noted is that two cases that need the diacritic class to be recognized occur when there are only three characters.

Figure 5:
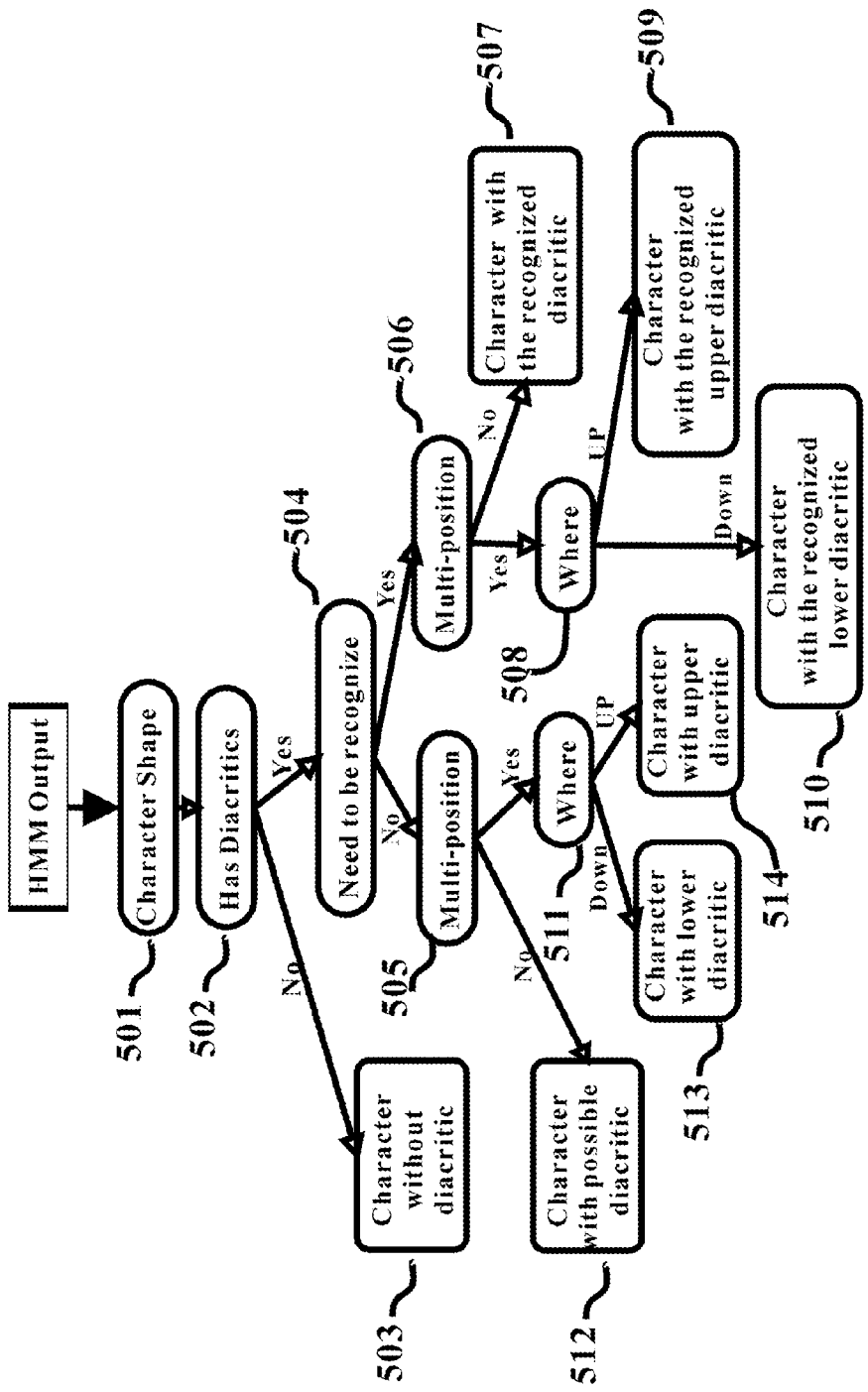
FIG. 5 is a schematic view of a decision tree for diacritics classification.

As shown in FIG. 5, the HMM output is combined with the diacritic features in a form of a decision tree. During diacritic recognition, zero or more objects around the character shape will be labeled as a diacritic. Each diacritic object is combined with the character shape to create a list of characters. The top valid character in the list which exists in the alphabetic table is to be selected as the final recognition character.

While preferred embodiments of the invention have been described above, the invention is not limited to disclosure in the embodiments and the accompanying drawings. Any changes or modifications without departing from the spirit of the invention fall within the scope of the invention.

What is claimed is:

1. A method for establishing a HMM-based encoding network using connectivity rules of Arabic optical characters in a recognition process, the method comprising:

providing three non-emitting states in the HMM-based encoding network: a beginning non-emitting state disposed at the beginning of said network, an end non-emitting state disposed at the end of said network, and a middle non-emitting state disposed at the middle of said network;

connecting said beginning non-emitting state to an isolated position character hidden Markov model, and said isolated position character hidden Markov model to said end non-emitting state;

connecting said beginning non-emitting state to a beginning position character hidden Markov model, and said beginning position character hidden Markov model to said middle non-emitting state;

connecting said middle non-emitting state to an end position character hidden Markov model, and said end position character hidden Markov model to said end non-emitting state;

connecting in parallel said middle non-emitting state to a middle position character hidden Markov model, and connecting said middle position character hidden Markov model back to said middle non-emitting state thereby forming a loop between said middle non-emitting state and said middle position character hidden Markov model;

connecting in parallel said middle non-emitting state to an elongation hidden Markov model, and connecting said elongation hidden Markov model back to said middle non-emitting state thereby forming a loop between said middle non-emitting state and said elongation hidden Markov model; and connecting said end non-emitting state to said beginning non-emitting state.

2. The method of claim 1, further comprising:

providing an input for said HMM-based encoding network, the input comprising feature vectors; and using said HMM-based encoding network and a Viterbi decoder to output the most optimal character sequence.

3. The method of claim 2, further comprising combining an output of said HMM-based encoding network and Viterbi decoder with a diacritics feature using a decision tree, thereby producing a final recognition result.

* * * * *